Feb. 2, 1971 T. R. TRILLING 3,560,963

FIELD EFFECT A/D CONVERTER

Filed June 27, 1968

INVENTOR.
THEODORE R. TRILLING

BY [signature]

ATTORNEY

United States Patent Office 3,560,963
Patented Feb. 2, 1971

3,560,963
FIELD EFFECT A/D CONVERTER
Theodore R. Trilling, Berkshire Road, R.D. 3, Doylestown, Pa. 18901
Continuation-in-part of application Ser. No. 361,916, Apr. 22, 1964. This application June 27, 1968, Ser. No. 740,609
Int. Cl. G08c 9/00
U.S. Cl. 340—347 12 Claims

ABSTRACT OF THE DISCLOSURE

A unipolar, field effect, solid state device of either the junction gate or MOS type is configured as an analog-to-digital converter. Each device comprises an elongated cylindrical channel having a source and drain at opposite ends thereof and a plurality of annular gates circumscribing the channel at spaced intervals along its length to finely constrain a beam of charged carriers. Horizontal and vertical deflection plates are positioned to modulate the beam and cause it to scan a metallized matrix for digital readout in accordance with an applied analog signal.

The invention described herein may be manufactured and used by or for the Government of the United States without the payment of any royalties thereon or therefor.

CROSS-REFERENCE TO RELATED APPLICATION

This application is a continuation-in-part of application Ser. No. 361,916, filed Apr. 22, 1964, now U.S. Pat. 3,416,152.

BACKGROUND OF THE INVENTION

This invention relates to analog-to-digital converters and more particularly to a unipolar, field effect, solid state device having a matrix upon which a beam of charged carriers is entrained to convert an analog signal modulating the beam into a series of digital outputs expressive of that analog signal.

It is often desirable to convert an analog signal of various kinds into a digital output of various kinds. For example, an analog signal may be converted into a pulse train wherein either the width of a pulse, the height of a pulse, or the sequence of a series of pulses is indicative of the height of the analog signal at that instant. In the information transmission field it is often desirable to convert an analog signal into a series of pulse trains for purposes of coding or to provide a series of outputs, each output being indicative of a certain height of the incoming analog signal.

Prior art devices in this field have shared the common failing of being too slow. For example, an attempt to break up a voice signal into a digital form may achieve only conversion of the low frequency components of the voice with substantial distortion of the voice signal or garbling of the message. Heretofore, vacuum tubes have been employed as cathode ray structures with matrices therein to convert an analog signal to a digital signal by the use of either switching elements in the matrix or by a method of converting directly to a pulse coded matrix. In the aforementioned parent application, analog-to-digital converters of this type are discussed in considerable detail. These special switching tubes and matrix devices require large cathode ray vacuum tube structures and large and numerous power supplies. In the above-referenced parent application is also disclosed a bipolar, solid state device having a considerable plurality of possible matrices usable therewith. While the bipolar device functions adequately for most applications it is somewhat difficult to fabricate and the materials from which it may be constructed are limited.

It is therefore desirable to provide a solid state analog-to-digital converter which may be easily fabricated from a variety of materials, which is small in size, requires low operating voltages and affords good resolution and deflection sensitivity.

SUMMARY OF THE INVENTION

Accordingly, it is the general purpose of the present invention to provide a solid state unipolar analog-to-digital converter of the field effect type. Two exemplary structures of such a solid state, field effect configuration are the junction gate type and the metal oxide semiconductor (MOS) or insulated gate type. Each of these devices comprises an elongated cylindrical bar or channel of semiconductor material doped either p-type or n-type, as desired, with ohmically contacted source and drain electrodes at each end. Carrier beam flow from source to drain is controlled by a plurality of annular gates provided inwardly of the ends of the channel and at spaced intervals along the longitudinal axis thereof. In the junction device the gates are doped opposite to the channel and recessed therewithin to form a p-n junction while in the MOS device no physical contact between gates and channel is maintained, these elemets being separated from one another by an oxide insulator. The gates themselves are not doped semiconductor material but comprise, rather, electrically conductive, plated metalized elements. Gold, for example, may be used. Beam deflection and modulation is accomplished by providing an analog signal to a pair of vertical deflection plates and a horizontal sweep signal to a pair of horizontal deflection plates, the electrostatic fields thus generated penetrating the channel in the area between the gates.

DESCRIPTION OF THE PREFERRED EMBODIMENT

Figures 1, 2, 3:
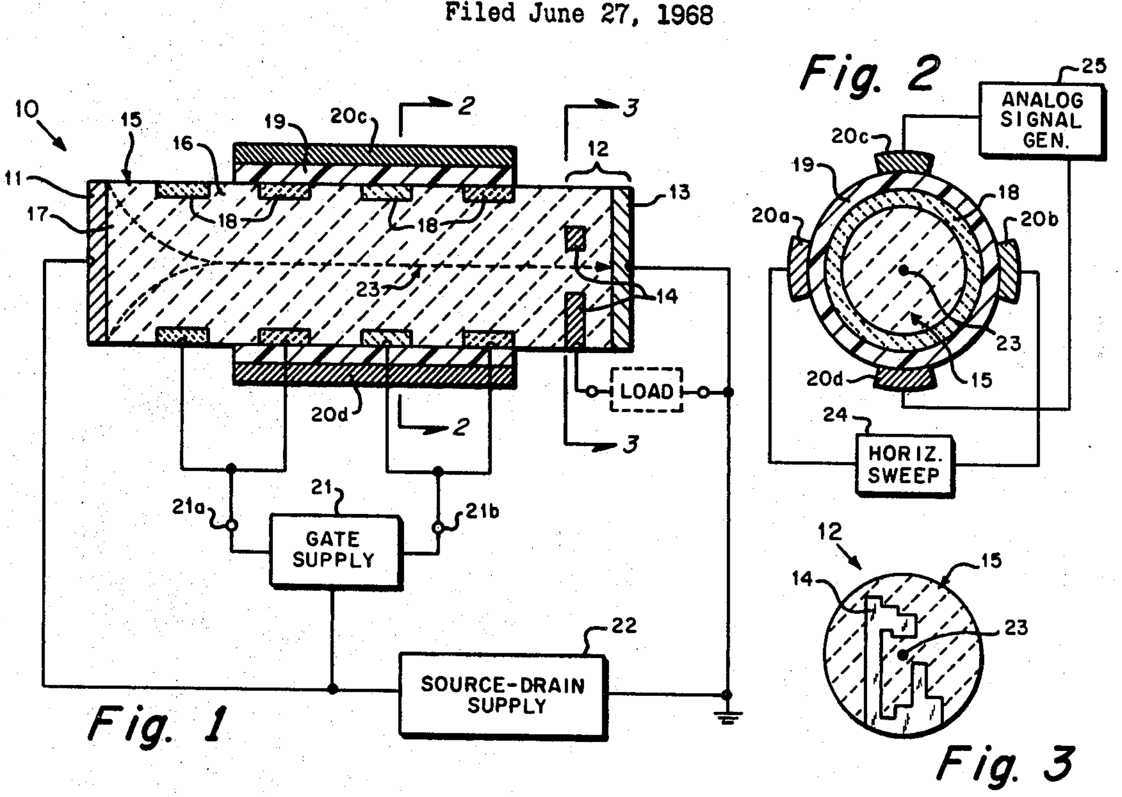
FIG. 1 is a longitudinal cross section of a junction type A/D converter in accordance with the invention.
FIG. 2 is a view taken along the line 2—2 of FIG. 1.
FIG. 3 is a view taken along the line 3—3 of FIG. 1.

Referring now to the drawing and more particularly to FIG. 1 there is shown a solid state, unipolar, field effect, junction type analog-to-digital converter 10. The converter 10 comprises an ohmically contacted source electrode 11, a collection structure 12, which includes an ohmically contacted drain 13 and a matrix 14, and a bar or channel 15 which may be made from any of a plurality of existing semiconductor materials and doped either n-type or p-type, as desired. While the converter 10 is in the form of an elongated cylinder and the source and drain electrodes are stated to be ohmically contacted thereto, it is to be understood both that other geometrical configurations are physically realizable and that the source and drain electrodes may be grown, deposited, evaporated or otherwise formed at the ends thereof.

Channel 15 includes two portions, a depletion region 16 and a charge carrier region 17. These regions will be explained more fully hereinafter. The p-n junction for the converter 10 is formed between the doped channel 15 and the oppositely doped gates 18. The gate structure comprises a plurality (here, four) of annular bands or rings separated from one another and spaced along the outer circumference of the channel 15, inwardly of the source 11 and drain 12. The gates 18 are embedded in recesses formed within the channel 15 such that the outer edges of the gates 18 are aligned with the outer circumference of the channel 15 and the gates 18 completely circumscribe the channel 15. A band or ring of suitable insulating material such as silicon dioxide 19 electrically insulates both the gates 18 and channel 15 from two pairs of deflection plates, pair 20*a* and 20*b*, and pair 20*c* and 20*d*, plates 20*a* and 20*b* being shown in FIG. 2. While the gates 18 are spaced along the entire length of the channel 15, the deflection plates are positioned slightly toward the collection structure 12 end for reasons hereinafter explained.

The gates 18 are supplied with a control potential by gate supply 21. Gate supply 21 includes a voltage source having two output terminals 21*a* and 21*b*, respectively, the voltage at 21*b* generally being greater than that at 21*a*. Thus, the two gates toward the source 11 end are at a potential lower than the two gates toward the drain 12 end of the converter 10. As these gates function as both accelerating and focusing means for the beam of entrained carriers, it is to be understood that various combinations of gate supply and/or potential are possible in accordance with the invention to provide varying degrees of beam acceleration and focus. The source and drain are provided with a suitable source-drain supply 22, the polarity both of the gate supply 21 and source-drain supply 22 being determined by the polarity of the doped channel (i.e., either p or n). In general, the magnitude of the source-drain supply 22 will be greater than that of the gate supply 21.

From FIG. 2 it is seen that the deflection plates comprise a pair of horizontal plates 20*a* and 20*b* and a pair of vertical plates 20*c* and 20*d*. Also shown in FIG. 2 is the insulating material 19, an annular gate 18, the channel 15, and the beam 23 of entrained carriers. It is to be noted that the entrained carriers may comprise either electrons or holes depending upon whether the channel material is doped p-type or n-type. The deflection plates are aligned horizontally and vertically with respect to the channel 15 in a manner analogous to the well known alignment in a cathode ray oscilloscope. The horizontal deflection plates 20*a* and 20*b* are fed by a horizontal sweep signal source 24 which may comprise a ramp function generator, or the like, in a manner well known in the art. Vertical deflection plates 20*c* and 20*d* are fed by an analog signal generator 25, this generator supplying the input signal to be digitalized.

Referring now to FIG. 3, there is shown the collection structure 12 including the channel 15, the beam of carriers 23, and the matrix 14. The matrix 14 is exemplary only, other shapes being readily utilized as desired, and is of a metalized material functioning to provide a digital code. With regard to its fabrication, it may, for example, be deposited directly upon the end face of the channel 15, whereupon other portions of the channel are permitted to grow therearound so that the matrix 14 becomes completely embedded therein.

Figures 4, 5:
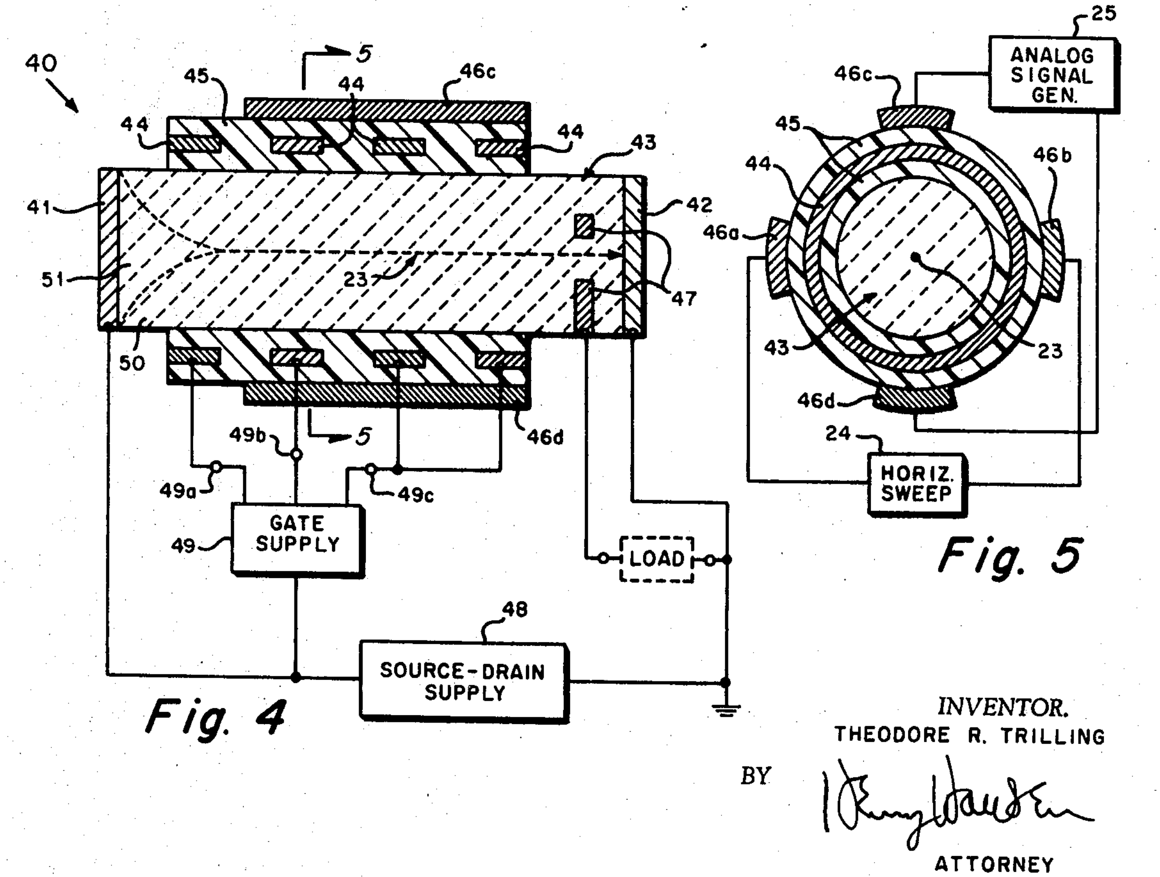
FIG. 4 is a longitudinal cross section of an MOS type A/D converter in accordance with the invention.
FIG. 5 is a view taken along the line 5—5 of FIG. 4.

Referring now to FIGS. 4 and 5 there is shown an MOS embodiment of the analog-to-digital converter. While both the MOS and junction devices are relatively easy to fabricate, in general, the MOS device is more readily fabricated than is the junction device. An operational difference between the two devices is the lower gate impedance of the junction device due to the flow of current across the junction. Structurally, the devices differ in that the gates of the MOS device are not doped semiconductor material and are electrically insulated from the doped channel.

The MOS converter 40 comprises a source electrode 41 and a drain electrode 42, the electrodes 41 and 42 being separated by a channel 43 of semiconductor material doped either p-type or n-type in a manner analogous with the junction converter of FIG. 1. The MOS converter 40 is provided with a plurality of annular gates 44 spaced along the channel 43 inwardly of its ends, these gates, however, being separated from the channel by a suitable oxide insulator 45. Thus, no junction is formed between the gates and the doped channel. Deflection plates are provided as in FIG. 1. Also as in FIG. 1, the converter 40 utilizes a metalized matrix 47 and is biased by a source-drain supply 48 and a gate supply 49. Here the gate supply 49 is shown having three output terminals 49*a*, 49*b*, and 49*c*. Generally, the voltage at point 49*c* may be greater than that at 49*b*, and the voltage at 49*b* may be greater than that at 49*a*. Thus, varying acceleration and focus potentials are possible. The connections between gate supply and gates both in the junction device and the MOS device are exemplary only, other combinations being possible. Also, as in the junction device, supply polarity is determined by the polarity of the doped elements.

FIG. 5 is substantially similar to FIG. 2 and shows that the deflection plates include horizontal deflection plates 46*a* and 46*b* and vertical deflection plates 46*c* and 46*d*. Analog signal is supplied from the generator 25 to the vertical deflection plates and the horizontal signal is supplied from the sweep 24 to the horizontal deflection plates. The annular gate 44 is shown completely embedded within the oxide layer 45 and hence electrically insulated from the channel 43. Also shown is the beam of entrained carriers 23. It is to be noted that, as in the junction gate converter 10, the channel 43 comprises a depletion region 50 and a charge carrier region 51. It should further be noted that FIG. 3 taken along the line 3—3 of FIG. 1 could also have been taken along a similar line through the MOS device of FIG. 4, the matrix in both cases being identical (if so desired). In addition, both the junction device of FIG. 1 and the MOS device of FIG. 4 are shown with a load in dashed outline connected between the respective matrix and drain at the ground side thereof. Such a load may be either externally connected to either converter through suitable ohmic contacts or may be intentionally grown as an integral part thereof.

Prior to discussing the operation of the analog-to-digital converter, the following brief theoretical explanation of field effect devices is provided. A unipolar device differs from a bipolar device (as disclosed in the above-mentioned parent application) in that the current is carried only by the free majority carriers in a conducting channel rather than by employing both positive and negative free carriers in the functioning of the device. A field effect semiconductor is a type of a unipolar device in which the available current carriers are controlled by the application of an electric field across the semiconductive surface. A typical field effect transistor, for example, employs an ohmically contacted source from which holes or electrons flow through a conducting channel of semiconductor material to a drain, also consisting of an ohmic contact. The conductivity of the channel is affected by the charge on a control electrode or gate. The gate may be either of the junction or insulated type. In the junction type, the gate comprises a layer of semiconductor material having a doped conductivity opposite to that of the channel and the p-n junction thus formed is reverse biased with respect to the channel, thereby forming a depletion layer which functions as an insulator and both limits and restricts the conducting channel. With electrons as the charge carriers, a more negative gate voltage will further reduce the channel thereby reducing the conductance thereof and a less negative voltage will increase the channel thereby increasing its conductance. A particular voltage can be reached at which, ideally, the channel conductance reduces to zero. This is the pinch off voltage.

In the insulated gate or MOS device, the metalized gate may be analogized as one plate of a capacitor which is separated by a thin insulator (the oxide) from the other plate of the capacitor (the channel). Depending upon the polarity of the doped chanel, the polarity and magnitude of the charge on the gate may be utilized to induce an equal amount of oppositely polarized charge in the channel thereby either enhancing or decreasing the conductivity thereof. Thus, with either the junction or MOS type field effect device it is possible to control the conductivity within the channel by controlling the voltage applied to the respective gates thereof.

The junction gates type analog-to-digital converter of FIGS. 1–3, inclusive, operates in the following manner. The source-drain supply 22 excites the electrons (or holes depending upon the doping of the channel and the plurality of the supply) at the source 11 end of the channel 15. These charged carriers are repelled longitudinally down the channel throughout the entire volume thereof and travel randomly toward the drain 13 end for collection thereby. These carriers would continue to so travel unless controlled by the gates 18. The gates 18, however, are biased by the supply 21 such that a cross field is set up perpendicular to the longitudinal axis of the channel (line of travel of the charged carriers), the magnitude and polarity being such that the electron beam is constrained into a very narrow well defined beam. Ideally, the voltage on the gates would be the pinch off voltage mentioned heretofore. It should now be apparent that upon constraining the carrier flow to a narrow beam 23, the channel 15 in the area between the beam 23 and the gates 18 is depleted of carriers (hence the name depletion region 16) and the remaining channel area is heavily concentrated with charge carriers (hence the name charge carrier region 17).

This well defined beam of carriers 23 is susceptible to horizontal and vertical deflection signals which set up a drift field in the manner disclosed fully in the aforementioned parent application, such that the beam 23 is caused to scan across the matrix. The metallized matrix and the drain collect all the charged carriers in proportion to the design of the matrix and the position of the beam at any instant of time. Alternatively stated, the matrix and drain collect the charged carriers proportionally as a function of matrix configuration and beam position to provide the digital output signal. It should be noted, however, that the deflection plates transform the signals supplied thereto into electrostatic fields which pass through the insulator 19 and into the channel 15 through the space provided between the annular gates 18. Alternatively, however, it is noted that if magnetic deflection coils were utilized in lieu of deflection plates there may be no need to separate the gates into a plurality of annular rings, the gate instead comprising but a single annular ring concentric with the channel. Further, as the beam is first constrained before the deflection thereof is effectuated, the length of the deflection plates should be shorter than the channel and positioned more toward the drain end. Also, from a fabrication standpoint, since some beam spreading may occur in the area between the last annular gate and matrix it may be desirable to position the matrix as close to a gate is is physically possible.

The operation of the system in the MOS configuration is substantially identical with that of the junction configuration of FIG. 1, the main difference being that there is no p-n junction formed and the oxide layer 45 serves as a dielectric for both the electrostatic capacitive-type field created by the voltage applied to gates 44 and the electrostatic field created by the voltage applied to deflection plates 46*a*–46*d*, inclusive. As with the junction configuration the deflection plates are positioned forward of the source electrode and the deflection fields pass into the channel after first passing through the area provided between the gates. Also, the matrix should be positioned as close to the last gate as is physically realizable. It should further be noted that the disclosed metalized matrix is merely an exemplary configuration and in no way is meant to restrict the invention. Thus, the matrix may comprise a single target or multiple targets as described, for example, in the aforementioned parent patent application. It should further be noted that the structures and embodiments as heretofore disclosed are by no means meant to be exclusive and may include other variations and modifications such as alternate gate and deflection structure and circuitry and/or the utilization of a single multitapped supply to provide all bias potentials. Moreover, the disclosed analog-to-digital converters may be fabricated other than as specifically described or configured. Thus, for example, thin film techniques, photoset structures, and other solid state configurations and techniques may be employed.

Accordingly, many modifications and variations of the present invention are possible in the light of the above teachings. It is to be understood that within the scope of the appended claims the invention may be practiced otherwise than as specifically described.

What is claimed is:

1. A solid state analog-to-digital converter comprising:
an elongated bar of doped semiconductor material rich in charge carriers of one polarity;
source electrode means contacting one end of said bar;
drain electrode means contacting the other end of said bar;
said charge carriers caused to flow through said bar from said source electrode means toward said drain electrode means upon application of a potential across said electrode means;
means circumscribing said bar inwardly of the ends thereof for constraining said carrier flow within said bar into a narrow beam comprising a layer of semiconductor material oppositely doped from said bar and positioned in mating contact therewith to form a p-n junction;
matrix means contiguous with said bar and interposed between said electrodes in the path of said beam; and
means causing said beam to scan said matrix in accordance with a supplied analog signal to provide a digital signal indicative thereof.

2. A solid state analog-to-digital converter comprising:
an elongated bar of doped semiconductor material rich in charge carriers of one polarity;
source electrode means contacting one end of said bar;
drain electrode means contacting the other end of said bar;
said charge carriers caused to flow through said bar from said source electrode means toward said drain electrode means upon application of a potential across said electrode means;
means circumscribing said bar inwardly of the ends thereof for constraining said carrier flow within said bar into a narrow beam comprising insulating means, and carrier beam control means embedded in said insulating means;
matrix means contiguous with said bar and interposed between said electrodes in the path of said beam; and
means causing said beam to scan said matrix in accordance with a supplied analog signal to provide a digital signal indicative thereof.

3. A solid state analog-to-digital converter according to claim 2 wherein:
said insulating means comprises an oxide layer; and
said carrier beam control means includes a plurality of metalized gates.

4. A solid state analog-to-digital converter according to claim 3 wherein said means causing said beam to scan said matrix comprises:
first deflection means insulated from said bar and receiving an analog signal; and
second deflection means perpendicular to said first deflection means and receiving a horizontal sweep signal.

5. A solid state analog-to-digital converter according to claim 4 wherein: said plurality of metalized gates surround said bar inwardly of its ends and at spaced intervals along the longitudinal axis thereof.

6. A solid state analog-to-digital converter according to claim 1 wherein said means causing said beam to scan said matrix comprises:
first deflection means insulated from said bar and receiving an analog signal; and second deflection means perpendicular to said first deflection means and receiving a horizontal sweep signal.

7. A solid state analog-to-digital converter according to claim 6 wherein said layer of semiconductor material comprises: a plurality of gates surrounding said bar inwardly of its ends and at spaced intervals along the longitudinal axis thereof, thereby forming a like plurality of p-n junctions.

8. A solid state analog-to-digital converter according to claim 7 further comprising: multi-terminal supply means for providing a plurality of selectable potentials to said gates.

9. A solid state analog-to-digital converter according to claim 8 wherein: said deflection means comprises horizontal and vertical deflection plates each of which provides an electrostatic scan signal to said beam in said bar through the interspaces between said gates.

10. A solid state analog-to-digital converter according to claim 9 wherein:

said bar is of circular cross section; and the conductivity of said bar is controlled by the voltage applied to said gates by depleting selected areas of said bar of charge carriers and concentrating other selected areas thereof with said charge carriers thereby constraining said charge carrier flow.

11. A solid state analog-to-digital converter according to claim 10 further comprising:

supply means connected across said source electrode and said drain electrode the polarity thereof being determined by the polarity of said charge carriers in said bar; and load means connected between said matrix and said drain electrode for receiving said digital signal.

12. A solid state analog-to-digital converter comprising:

a unipolar transistor with an elongated bar of doped semiconductor material rich in charge carriers of only one polarity having a source electrode contacting one end of said bar, a drain electrode at the other end of said bar and gating means circumscribing said bar for constraining a carrier flow within said bar into a narrow beam;

matrix means contiguous with said bar and interposed between said electrodes in the path of said beam; and means disposed about said charge carriers for causing said beam to scan said matrix in accordance with a supplied analog signal to provide a digital signal indicative thereof.

References Cited

UNITED STATES PATENTS

| | | | |
|---|---|---|---|
| 3,416,152 | 12/1968 | Trilling | 313—94 |
| 3,075,147 | 1/1963 | Llewellyn | 315—8.5 |

OTHER REFERENCES

J. W. Horton: Field-Effect Scanner, IBM Tech. Disclosure, vol. 6, No. 12, May 1964, pp. 85–86.

DARYL W. COOK, Primary Examiner

J. GLASSMAN, Assistant Examiner

U.S. Cl. X.R.

313—94; 315—8.5